US006367849B1

(12) United States Patent
Tatsuta et al.

(10) Patent No.: US 6,367,849 B1
(45) Date of Patent: Apr. 9, 2002

(54) JOINT FOR CORRUGATED PIPE

(75) Inventors: Yoshiaki Tatsuta; Kazuya Yamashita; Takeshi Mochiduki; Kentaro Takenaka, all of Osaka (JP)

(73) Assignee: Totaku Industries, Inc., Osaka (JP)

( * ) Notice: Subject to any disclaimer, the term of this patent is extended or adjusted under 35 U.S.C. 154(b) by 0 days.

(21) Appl. No.: 09/576,025

(22) Filed: May 23, 2000

(30) Foreign Application Priority Data

May 24, 1999 (JP) ............................................ 11-143510

(51) Int. Cl.[7] ..................... F16L 17/035; F16L 17/04; F16L 19/00
(52) U.S. Cl. ..................... 285/373; 285/367; 285/411; 285/903
(58) Field of Search ................................ 285/366, 367, 285/373, 410, 411, 903

(56) References Cited

U.S. PATENT DOCUMENTS

| | | | | |
|---|---|---|---|---|
| 3,006,663 A | * | 10/1961 | Bowne ................... | 285/367 X |
| 4,417,755 A | * | 11/1983 | Gittleman ............... | 285/367 X |
| 4,627,645 A | * | 12/1986 | Sauer ..................... | 285/373 X |
| 5,203,594 A | * | 4/1993 | Straub .................... | 285/373 X |
| 5,249,829 A | * | 10/1993 | Hendrickson ........... | 285/373 X |

\* cited by examiner

*Primary Examiner*—Neill Wilson
(74) *Attorney, Agent, or Firm*—McGinn & Gibb, PLLC

(57) ABSTRACT

A joint (and method) connects synthetic resin corrugated pipes, each of the corrugated pipes including a pipe wall having sectionally rectangular wall portions and sectionally circular wall portions disposed alternately in a longitudinal direction of the corrugated pipe. The sectionally circular wall portions each include an annular-shaped protrusion projecting outwardly from the sectionally circular wall portions disposed substantially at a center of the sectionally circular wall portion between adjacent sectionally rectangular wall portions in the longitudinal direction. The joint includes a pair of semicircular-shaped joint main bodies coupled with each other by bolts, each having a recessed groove defined by both of its side edge portions in a width direction thereof and also having tightening bolt holes respectively formed at both peripheral end portions in a peripheral direction thereof, and a pair of watertight packings respectively formed of elastic material and respectively received in the recessed grooves of the semicircular-shaped joint main bodies, each of the watertight packings having a semicircular portion which includes two edge portions disposed at two end portions in a width direction thereof, and a projecting portion disposed between the two edge portions in the width direction and inwardly projected in a radial direction of the pipe.

28 Claims, 11 Drawing Sheets

JOINT FOR CORRUGATED PIPE

BACKGROUND OF THE INVENTION

The present invention relates to a joint used to connect together two synthetic resin corrugated pipes each including a pipe wall which comprises a sectionally square wall portion and a sectionally circular wall portion alternately in the axial direction of the pipe as well as an annular-shaped projecting strip portion formed in the sectionally circular wall portion.

Conventionally, there are known various types of synthetic resin corrugated pipes and also there are manufactured and used various types of connecting joints suitable for connection of the respective pipe structures of such synthetic resin corrugated pipes. These joints can be roughly classified into a synthetic resin corrugated pipe whose main body is formed in a cylindrical shape and a synthetic resin corrugated pipe which includes at least two main bodies formed as at least two split bodies. The present invention relates to the latter type of joint including at least two split main bodies.

Both of the conventional pipe joints of a cylindrical main body type and of at-least-two-split-main-body type have a diameter larger than the outer peripheral diameter of pipes to be connected together by the pipe joint or have a size larger than the outer peripheral shape of such pipes. That is, either of the conventional pipes joint has a shape which projects outwardly of the outer peripheries of the pipes to be connected together by the pipe joint.

Thus, after the two pipes are connected together by the joint, the connected portions of the pipes become larger in size. For this reason, it is rather considered as common knowledge that, at least in the portions of the pipes where the joint is present, a plurality of pipes cannot be arranged side by side or on top of one another in such a close contact manner as in the non-connected portions of the pipes.

SUMMARY OF THE INVENTION

As described above, the present invention relates to a joint used to connect together two synthetic resin corrugated pipes each including a pipe wall comprising a sectionally square wall portion and a sectionally circular wall portion alternately formed in the axial direction of the pipe as well as an annular-shaped projecting strip portion formed in the sectionally circular wall portion. That is, it is an object of the invention to provide a joint which, even in case where the joint connects two pipes together, does not project from the outer peripheries of the pipes to become larger in size than such pipes outer peripheries in the connected portions of the pipes. Also, it is another object of the invention to provide a method for connecting together the pipes of the above-mentioned type using a joint according to the invention, in which a plurality of pipes, even in case where they have portions that are connected together by the joint, can be arranged side by side or piled up on top of one another in the connected portions thereof in such a close contact manner as in the non-connected portions thereof.

Now, describing the structure of the invention employed to attain the above objects using reference characters used in the following description of the preferred embodiments of the invention, for connection of a synthetic resin corrugated pipe P in which a pipe wall 1 comprises a sectionally square wall portion 2 and a sectionally circular wall portion 3 formed alternately in the axial direction of the pipe P, while the sectionally circular wall portion 3 includes an annular-shaped projecting strip portion 4, there is provided a joint which comprises: two synthetic resin joint main bodies 10 respectively comprising two semicircular-shaped split bodies; and, two watertight packings 20 respectively formed of elastic material, while each packing 20 includes two flanges 22, 22 respectively projecting from the two end portions of a semicircular portion 21 of the packing 20 in the outer peripheral direction thereof. Each joint main body 10 is structured such that, except for its two side edge portions 14, 14 in the width direction thereof, it is formed as a recessed groove 13 for receiving its associated packing 20 and includes tightening bolt holes 15, 15 respectively formed in the two end portions 12, 12 of the main body 10 in the peripheral direction thereof. And, each watertight packing 20 is structured such that the width-direction central portion of a semicircular-shaped portion 21 thereof is formed as a projecting portion 23 projecting on the inner surface side thereof and the two side edge portions of the packing 20 are respectively formed as recessed portions 24, 24 recessed on the outer peripheral surface side of the packing 20. Also, in a state where the packing 20 is mounted into the joint main body 10, the two side recessed portions 24, 24 are recessed more deeply on the outer peripheral surface side of the joint than the two side edge portions 14, 14 of the joint main body 10, and the surface portions f, f of the two end portions of the packing 20 in the peripheral direction thereof project further outwardly of the surface portions F, F of the two end portions 12, 12 of the joint main body 10 by a proper thickness t.

Also, according to the invention, there is provided a method for connecting a synthetic resin corrugated pipe P in which, as described above, a pipe wall 1 comprises a sectionally square wall portion 2 and a sectionally circular wall portion 3 formed alternately in the axial direction of the pipe P, while the sectionally circular wall portion 3 includes an annular-shaped projecting strip portion 4. In the present connecting method, using a joint which comprises two synthetic resin joint main bodies 10 respectively comprising two semicircular-shaped split bodies and further includes tightening bolt holes 15, 15 respectively formed in the two end portions 12, 12 of each main body 10 in the peripheral direction thereof, the respective ends of two pipes P, P to be connected together, after they are cut except for the annular-shaped projecting strip portions 4 of the sectionally circular wall portions 3 of the two pipes P, P, are butted against and connected to each other while the sectionally square wall portions 2 of the two pipes P, P are held at the same posture in the peripheral direction thereof; two watertight packings 20 are respectively inserted into the connected portions of the two pipes P, P; and, the two joint main bodies 10 are tightened and connected together on the diagonal line of the sectionally square wall portions 2 of the two pipes P, P to thereby connect together the two pipes P, P.

Further, the above-mentioned object can be attained by a joint for connection of synthetic resin corrugated pipesP, according to the present invention, each of the corrugated pipes including a pipe wall 1 which comprises a sectionally retangular wall portions 2 and a sectionally circular wall portions 3 disposed alternately in a longitudinal direction of the corrugated pipe wherein each of the sectionally circular wall portions 3 includes an annular-shaped protrusion 4 which projects outwardly from the sectionally circular wall portions that is disposed substantially at a center of the sectionally circular wall portion between adjacent sectionally rectangular wall portions in the longitudinal direction, the joint comprising:

a pair of semicircular-shaped joint main bodies 10 coupled with each other by bolts, each having a recessed groove 13 defined by its both side edge portions 14, 14 in a width direction thereof and also having tightening bolt holes 15, 15 respectively formed at both peripheral end portions 12, 12 in a peripheral direction thereof; and a pair of watertight packings 20 respectively formed of elastic material and respectively received in the recessed grooves 13 of the semicircular-shaped joint main bodies 10, each of the watertight packings 20 having a semicircular portion 21 which includes two edge portions 24, 24 disposed at two end portions in a width direction thereof, and a projecting portion 23 disposed between the two edge portions in the width direction and inwardly projected in a radial direction of the pipe, wherein a thickness of each of the two edge portions 24, 24 in the radial direction is smaller than a height of the side edge portion 14 in the radial direction, whereby, in a state where each the packings20 is mounted into the respective joint main bodies 10 and the joint joints the pipes, two side recessed portions 24 into which the annular-shaped protrusions 4 of the pipes are respectively received are formed by the two edge portions 24, 24, and wherein the surface portions f, f of the two end portions of the packing 20 in the peripheral direction thereof project further outwardly of the surface portions F, F of the two end portions 12, 12 of the joint main body 10 by a predetermined thickness t, and wherein each of the watertight packing 20 further comprises flanges 22, 22 disposed at two end portions of the semicircular-portion 21 in a peripheral direction thereof and outwardly projected in the radial direction.

In the joint, the joint main body 10 may be formed as a semicircle slightly shorter than a regular semicircle.

In the joint, the joint main body 10 may be formed substantially identical with or smaller in size than the outer peripheral shape of the sectionally rectangular wall portion 2 of the pipe P.

In the joint, the watertight packing 20 may include, on the inner surface of the projecting portion 23, two ribs r, r respectively extending along the peripheral direction of the packing 20 and inwardly projecting in the radial direction of the pipe.

Further, in the joint, the watertight packing 20 may include, on at least one of the two end portion surface portions f, f, a rib R formed so as to terminate toward the inner surface side of the projecting portion 23 of the packing 20.

In the joint, it it preferable that the predetermined thickness t of the watertight packing 20 is set in the range of 0.1–1.0 mm, more preferably in the range of 0.2–0.5 mm.

Furthermore, in the joint, each of the recessed grooves 13 may comprise a projecting beam 13a which is formed at its intermediate portion in the width direction thereof and is inwardly projected in the radial direction of the pipe.

Moreover, in the joint, each of the semicircular-shaped joint main bodies preferably comprises recessed step portions 16 which are disposed at two peripheral ends thereof for receiving the respective flanges 22, 22 of the packing 20.

In addition, in the above-mentioned joint, the thickness of each of the flanges in the peripheral direction is preferably larger than that the depth of each of the recessed step portions in the peripheral direction, in a state where each of the packings 20 is mounted into the respective joint main bodies 10.

The above-mentioned object can also be attained by a method for connecting a pair of synthetic resin corrugated pipesP, according to the present invention, each of the corrugated pipes including a pipe wall 1 which comprises a sectionally rectangular wall portions 2 and a sectionally circular wall portions 3 disposed alternately in a longitudinal direction of the corrugated pipe wherein each of the sectionally circular wall portions 3 includes an annular-shaped protrusion 4 which projects outwardly from the sectionally circular wall portions that is disposed substantially at a center of the sectionally circular wall portion between adjacent sectionally rectangular wall portions in the longitudinal direction, the corrugated pipe connecting method comprising the steps of:

preparing the pair of the pipes each of which is cut into a predetermined length at a portion of the sectionally circular portion in a plane substantially perpendicular to an axis of the pipe while remaining the annular-shaped projecting strip portions 4, abutting the cut portions of the pipes each other, and holding them at the same posture in the peripheral direction thereof;

putting a joint on the connected portions of the pair of pipes P, P wherein the joint comprises a pair of joint main bodies 10 respectively made of two semicircular-shaped split bodies each having tightening bolt holes 15, 15 formed in its two end portions 12, 12 of the main body 10 in the peripheral direction thereof, and a pair of watertight packings 20; and fastening bolts inserted in the tightening bolt holes 15, 15 and then connecting the two joint main bodies 10 together on the diagonal line of the sectionally rectangular wall portions 2 of the two pipes P, P, to thereby joint together the two pipes P, P.

DETAILED DESCRIPTION OF THE PREFERRED EMBODIMENTS

In carrying out the above-structured joint for a corrugated pipe, the joint main body 10 can be formed in a semicircle of the order of 176–178 degrees slightly smaller than a regular semicircle of 180 degrees so that, in use, a tightening force can be easily applied over the whole periphery of the joint, or the outside shape of the joint main body 10 can be formed almost equal to or slightly smaller than the outer peripheral shape of the sectionally square wall portion 2 of the pipe P.

Also, in carrying out the present joint, the watertight packing 20 may be structured such that, on the inner surface of the projecting portion 23 of the watertight packing 20, there are provided two ribs r, r which respectively project along the peripheral surface thereof, or, on one or both of the surface portions f of the two end portions of the watertight packing 20, there may be provided a rib R which terminates toward the inner surface side of the projecting portion 23 of the watertight packing 20. Further, the projecting thickness t of the watertight packing 20 toward the outside of the two end portions of the watertight packing 20 may be set preferably in the range of 0.1–1.0 mm, more preferably, in the range of 0.2–0.5 mm, because such range makes it possible to facilitate the positive maintenance of the watertight condition.

The synthetic resin material for forming the joint main body 10 used in the invention is not limited to specific material but, preferably, it may be polyolefin-system resin such as polyethylene and polypropylene, or may be thermoplastic hard resin such as polyvinyl chloride, or may be FRP made of resin material reinforced with glass fiber; and, more preferably, there may be selected material which is hard to degrade with time and is excellent in tensile strength. Also, as the material for forming the watertight packing 20, there can be used not only natural rubber and synthetic rubber but also soft synthetic resin material having elasticity. Further, the joint main body 10 and watertight packing 20 may also be produced separately from each other and, after produced separately, they may be bonded together to thereby provide an integral body; or, in use, they may be fitted with each other.

[Embodiments]

Figure 1:
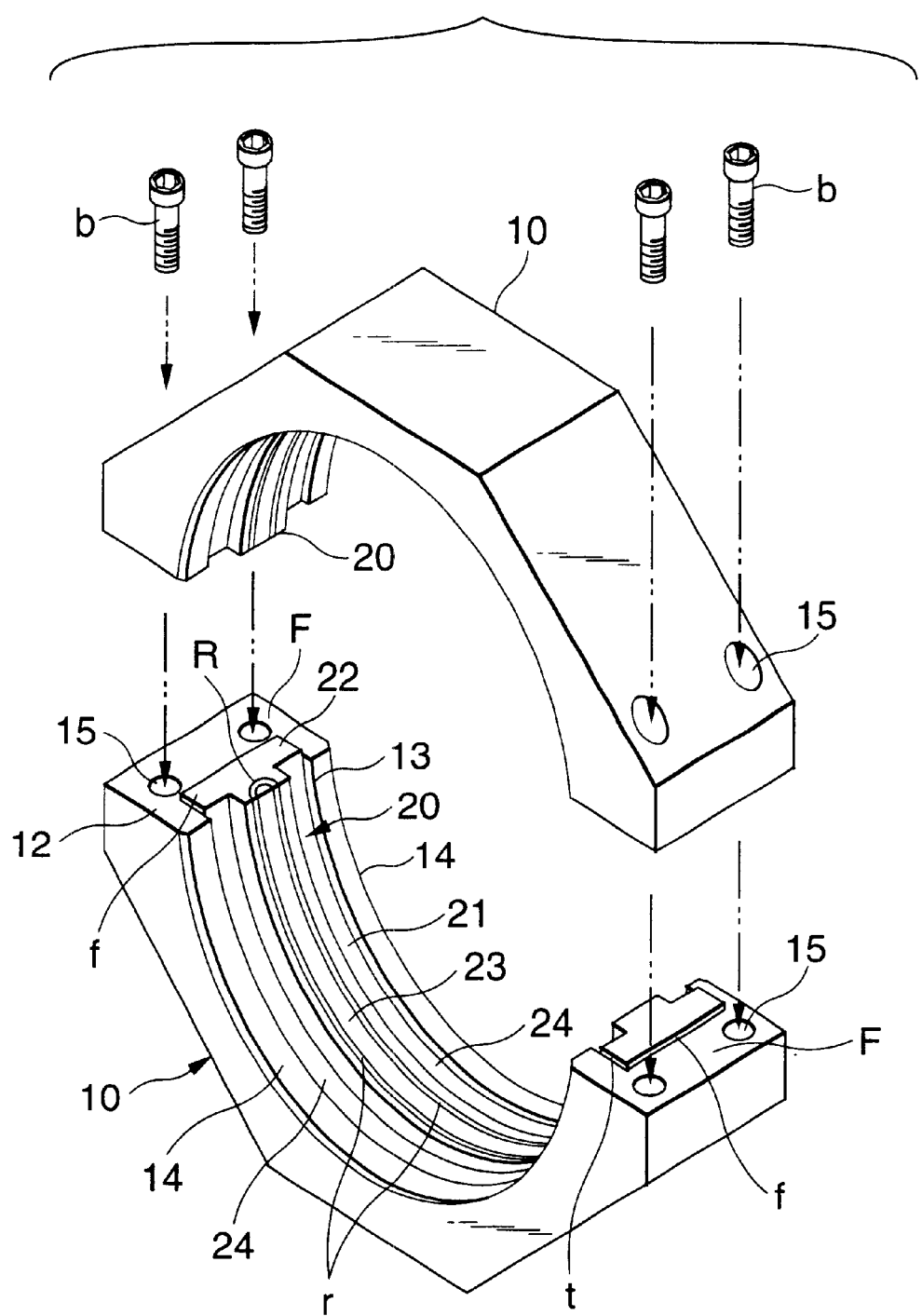
FIG. 1 is a perspective view of a joint according to a first embodiment of the invention.
Figure 2:
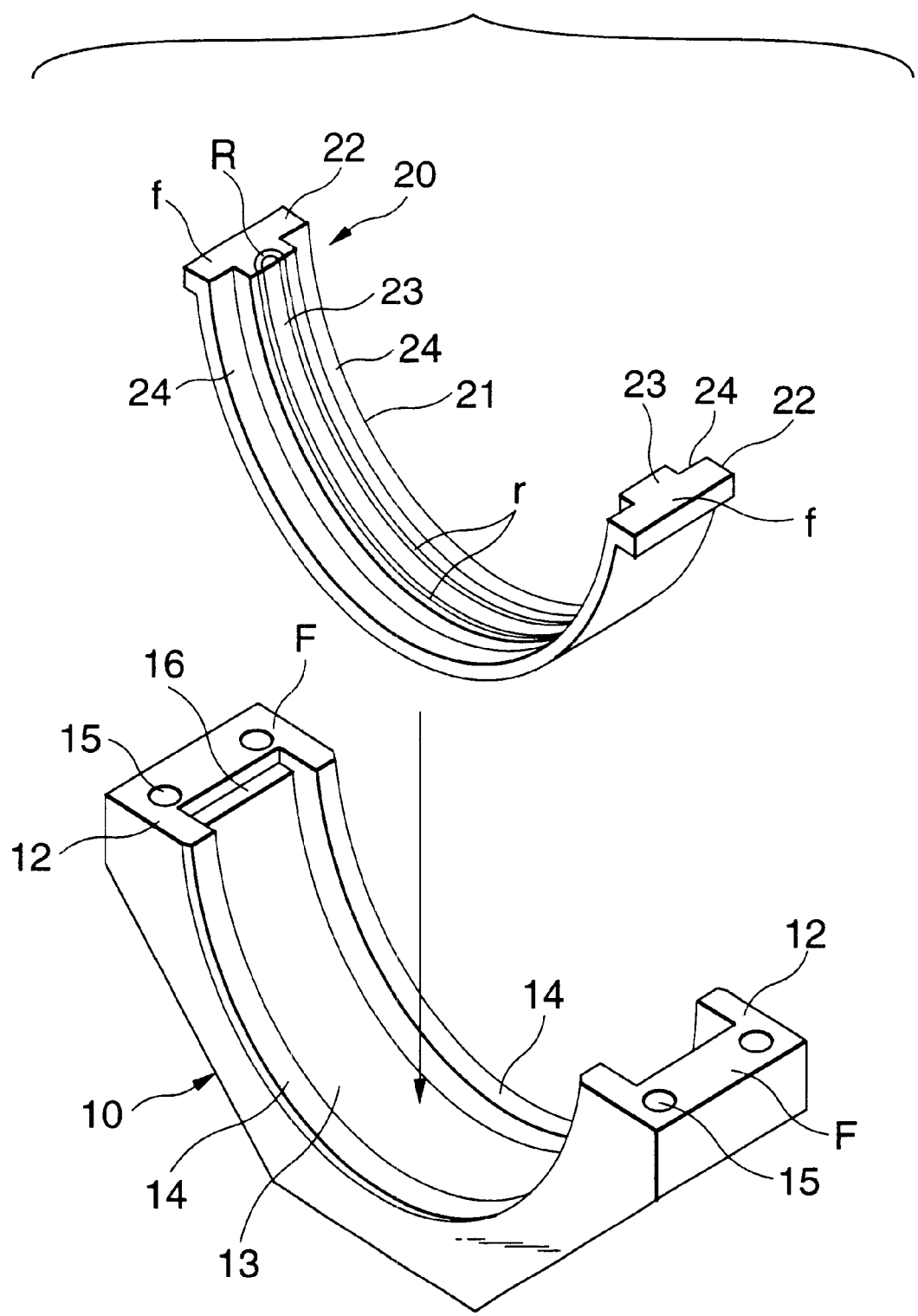
FIG. 2 is a perspective view of a joint main body and a packing of the joint according to the first embodiment.
Figure 3:
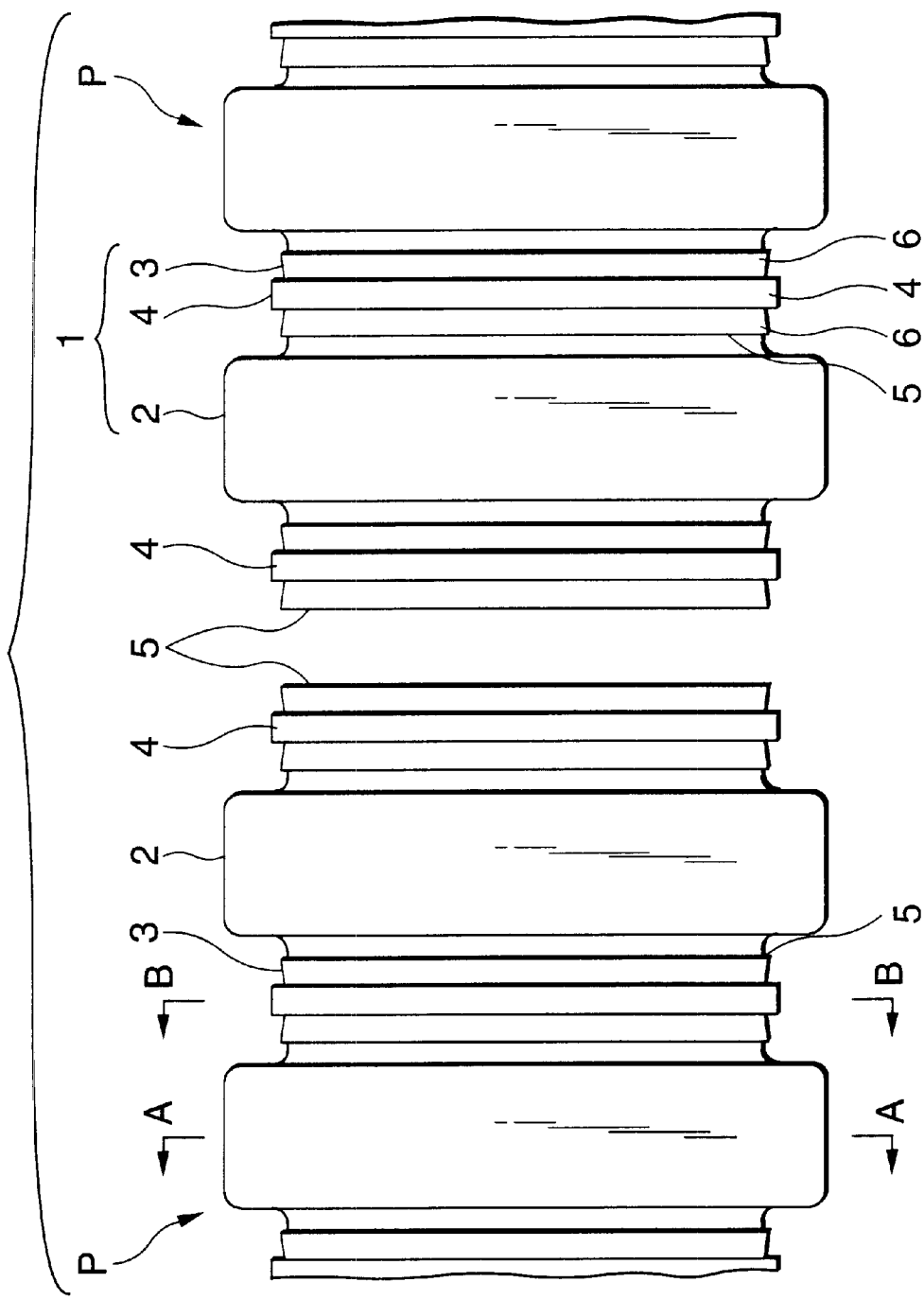
FIG. 3 is a front view of corrugated pipes to be connected by the above joint.
Figure 4:
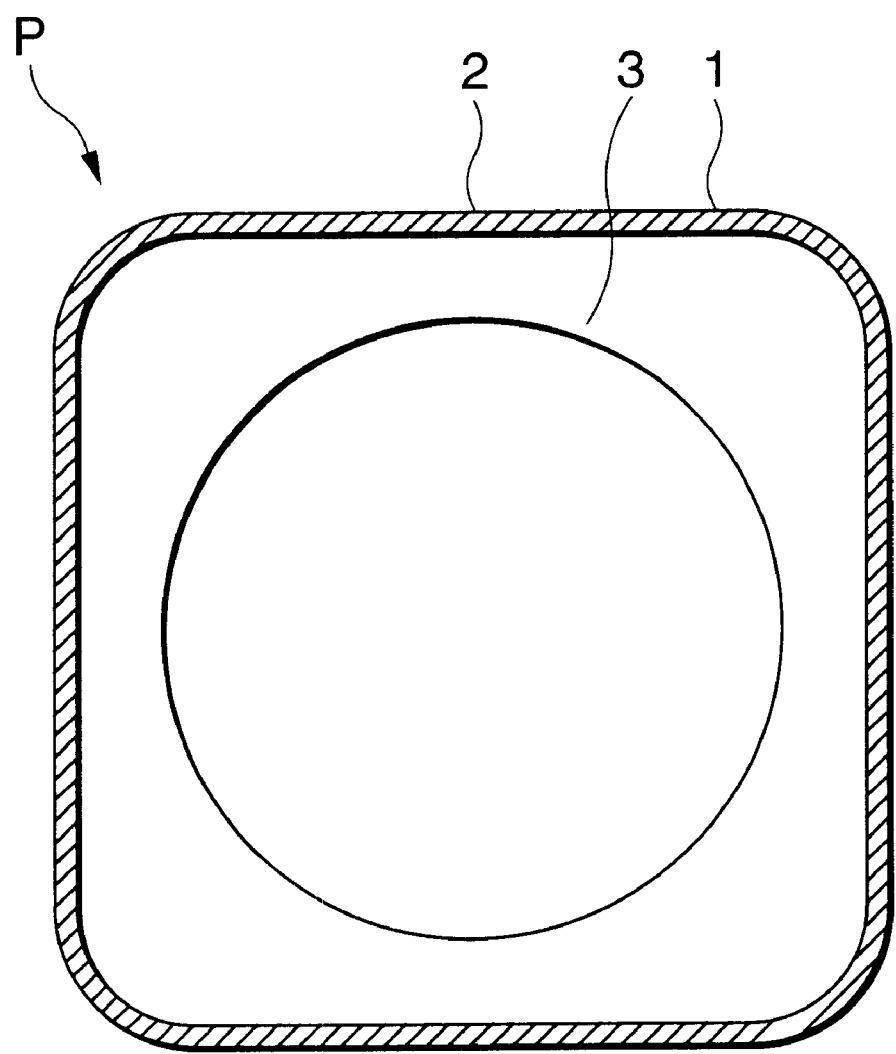
FIG. 4 is a section view taken along the line A—A shown in FIG. 3.
Figure 5:
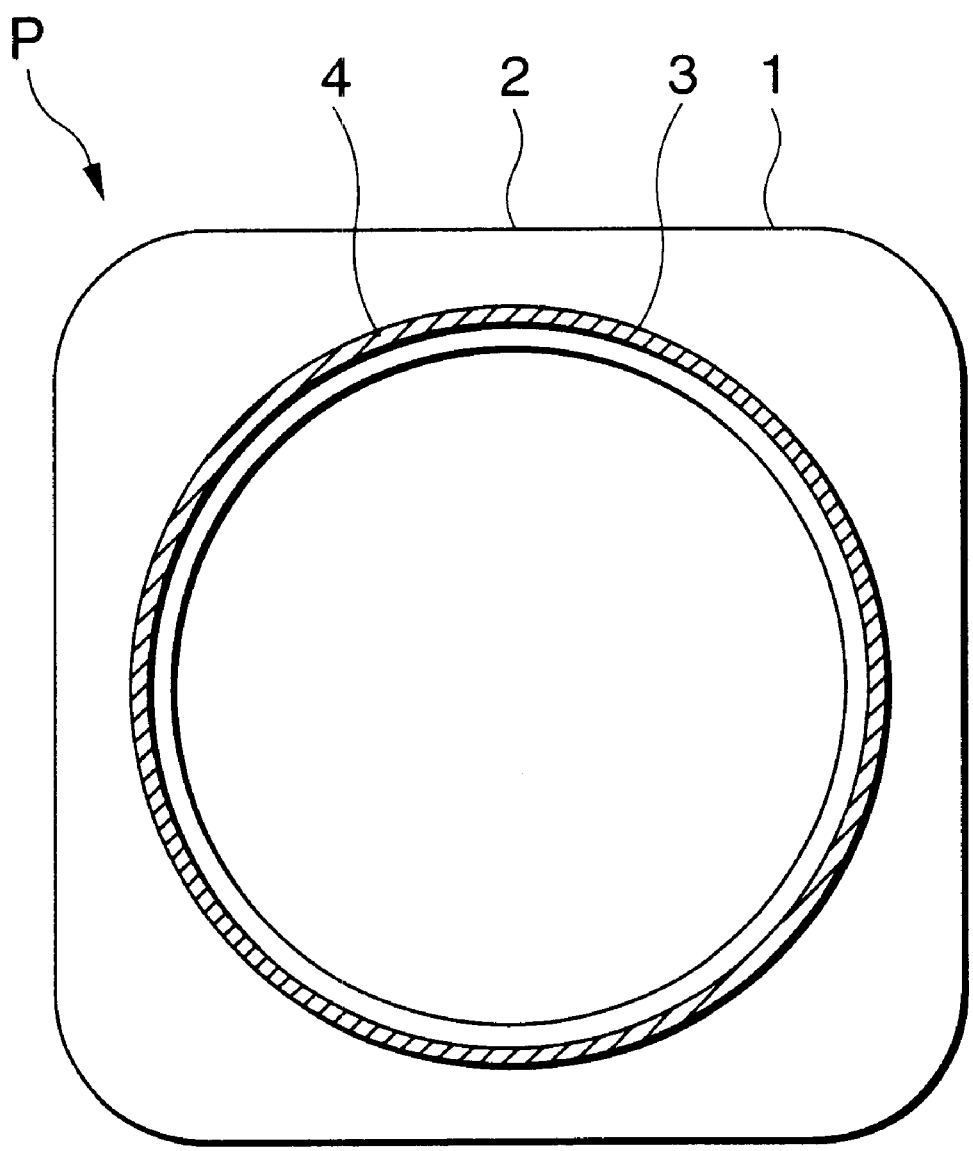
FIG. 5 is a section view taken along the line B—B shown in FIG. 3.
Figure 6:
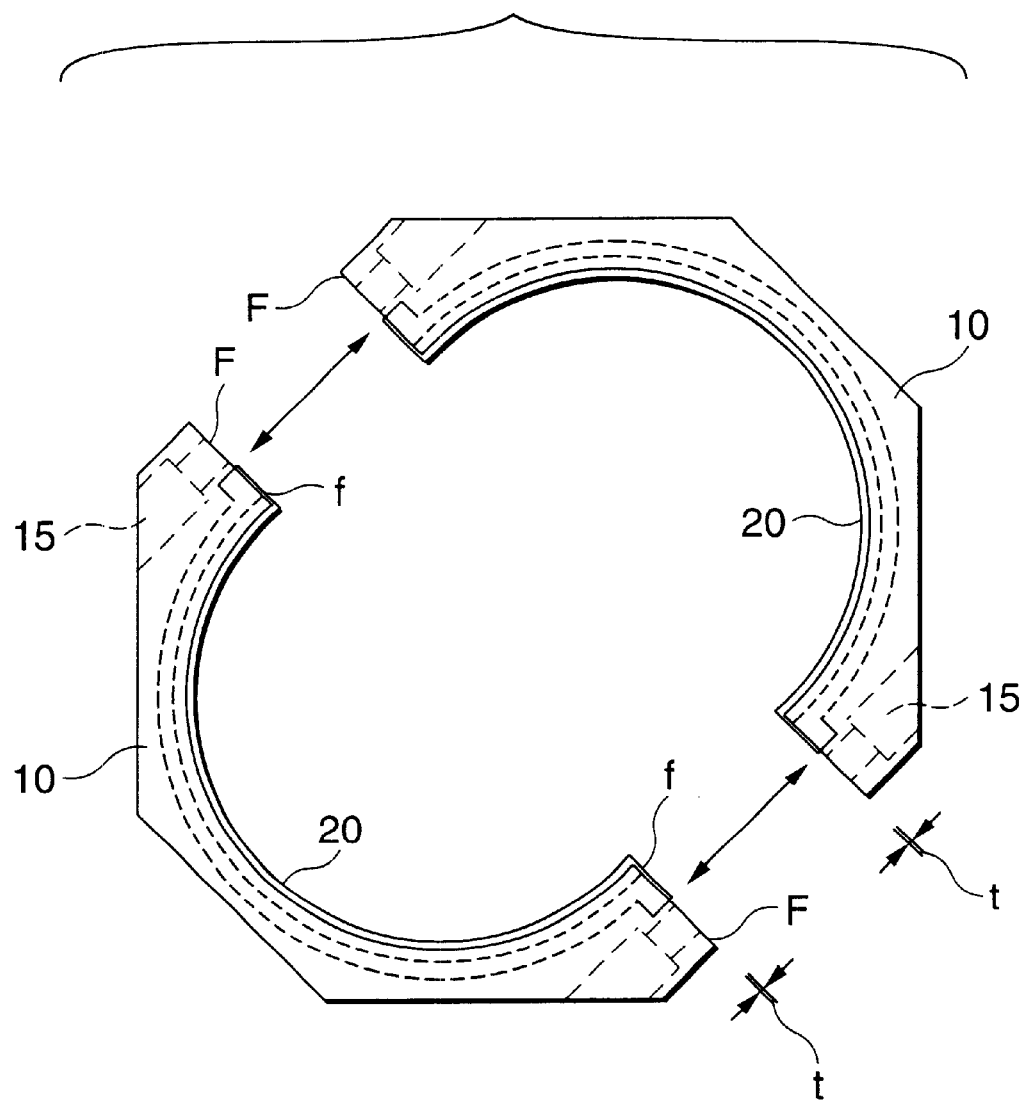
FIG. 6 is a side view of the joint, showing its separated state.
Figure 7:
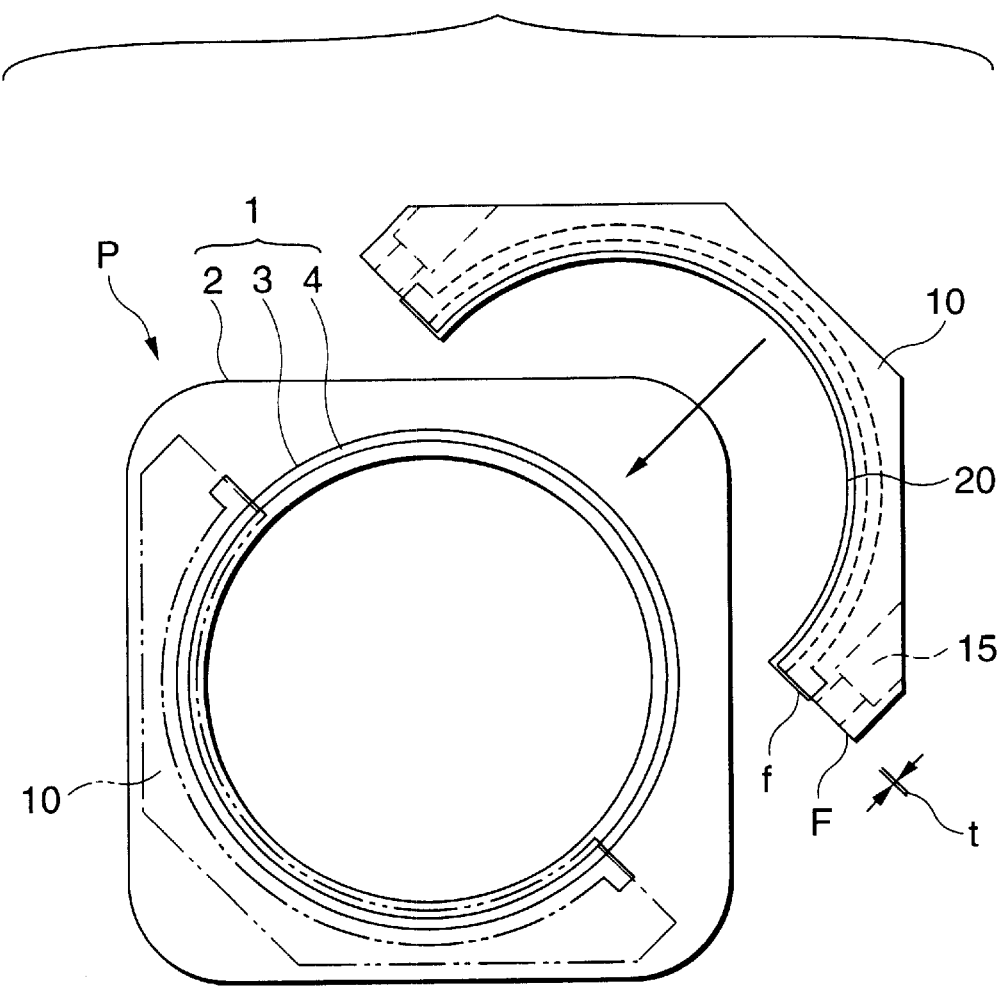
FIG. 7 is an explanatory side view of a joint according to the first embodiment and a pipe, showing how to connect the joint to the pipe.
Figure 8:
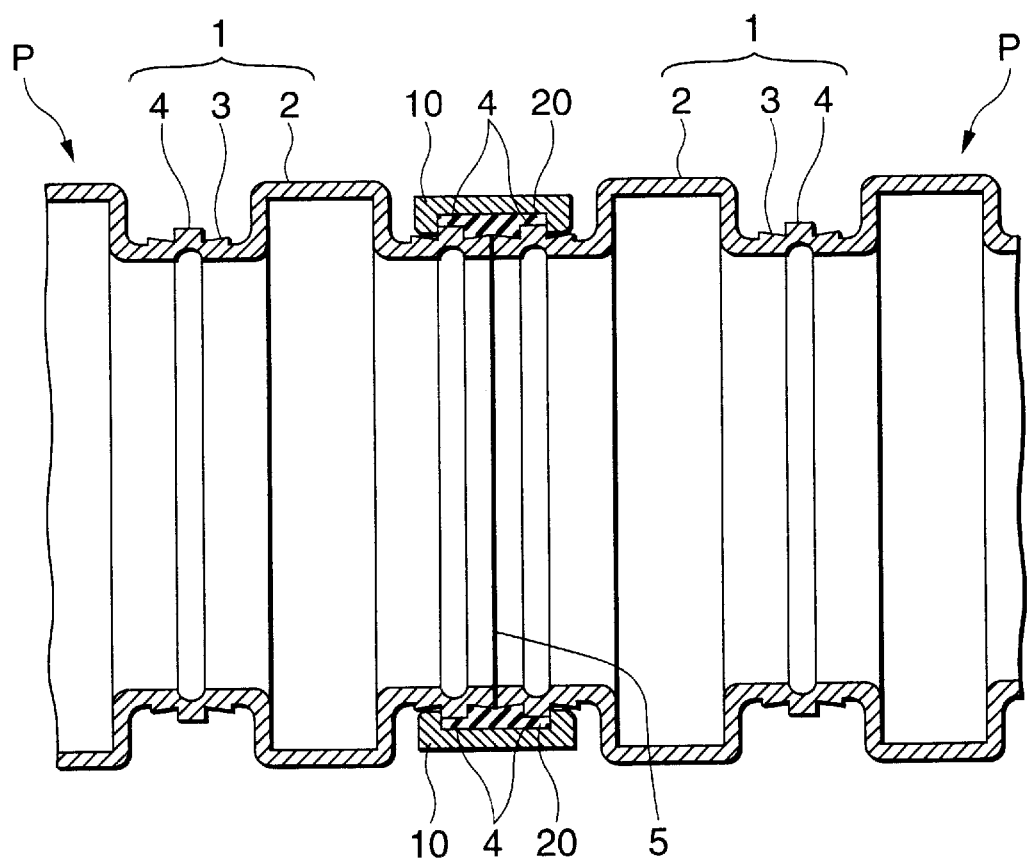
FIG.8 is a longitudinal section view of the connected state of the joint to two pipes.
Figure 9:
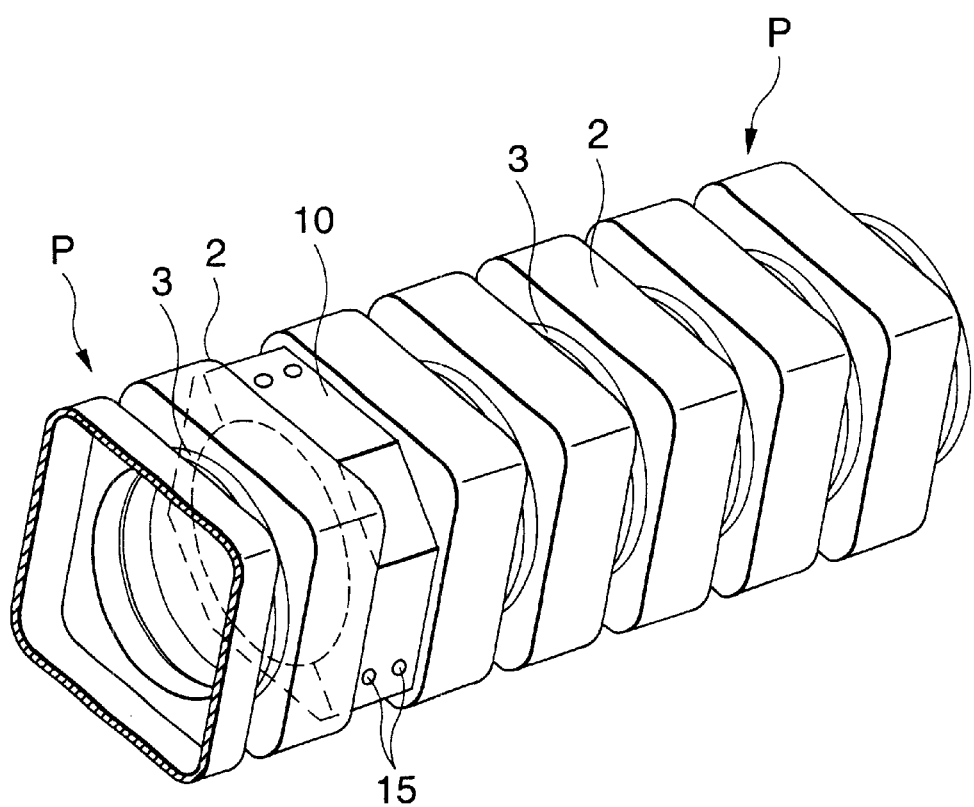
FIG. 9 is a perspective view of the connected state of the joint to the two pipes.

Now, description will be given below of the preferred embodiments of a joint for a corrugated pipe according to the invention with reference to the accompanying drawings. FIGS. 1 to 9 respectively show a first embodiment of a joint for a corrugated pipe according to the invention and two corrugated pipes to be connected together by the joint. Specifically, FIG. 1 is a perspective view of the whole shape of a joint according to the first embodiment; FIG. 2 is a perspective view of a packing and a joint main body of the joint according to the first embodiment; FIGS. 3 to 5 are respectively front view and section views of corrugated pipes to be connected by the above joint; FIG. 6 is an explanatory side view of the shape of the joint; FIG. 7 is a side view of the joint, showing means for connecting the joint to a pipe; and, FIGS. 8 and 9 are respectively longitudinal section view and perspective view of the connected state of the joint to two pipes.

In the present embodiment, a joint, as shown in FIGS. 1 and 2, comprises a set of two joint main bodies 10, 10 consisting of two single moldings formed of hard polyvinyl chloride resin as two semicircular-shaped split bodies, and a set of two watertight packings 20, 20 which respectively consist of two single moldings formed of synthetic rubber and also which respectively include flanges 22, 22 formed integral therewith so as to project from the two end portions of a semicircular-shaped main body portion 21 in the outer peripheral direction thereof.

The joint main body 10 is formed as one of two split bodies. That is, when the two joint main bodies 10 or the two split bodies are disposed opposed to each other, the outside shape thereof provides a substantially octagonal shape as a whole and the inside shape thereof provides a circular shape as a whole. As shown in FIG. 2, the joint main body 10, except for the width-direction two side edge portions 14, 14 thereof, is formed as a recessed groove 13 for receiving its associated watertight packing 20 and the peripheral-direction two end portions 12, 12 of the joint main body 10 respectively include tightening bolt holes 15, 15. Also, as shown in FIG. 2, in the peripheral-direction two end portions of the recessed groove 13, there are formed recessed step portions 16 for receiving the flanges 22 of the packing 20.

Further, the joint main body 10 according to the present embodiment is structured such that the whole shape thereof has a semicircular shape slightly smaller than a regular semicircle. Due to this, when the joint is used to connect two pipes together, a tightening force can be easily transmitted over the whole shape of the joint main body 10. Also, the outside shape of the joint main body 10, as shown in FIGS. 7 and 9, is formed slightly smaller than the outer peripheral shape of the sectionally square wall portion 2 of a pipe P (which will be discussed later).

The semicircular-shaped main body portion 21 of the watertight packing 20 has an almost flat outer surface; the width-direction center portion of the main body portion 21 includes a projecting portion 23 which is formed large in thickness and projects on the inner surface side of the main body portion 21; and, the two side edge portions of the main body portion 21 are respectively formed as recessed portions 24, 24 which are formed small in thickness and are recessed on the outer peripheral surface side of the main body portion 21, while the width of the watertight packing is set so as to be identical with the width of the recessed groove 13 of the joint main body 10.

In the case of the packing 20, as shown in FIG. 1, in a state where it is mounted into its associated joint main body 10, the two side recessed portions 24, 24 of the packing 20 are respectively recessed more deeply on the outer peripheral surface side of the joint than the two side edge portions 14, 14 of the joint main body 10 to thereby form, between the two side edge portions 14, 14 and the central projecting portion 23, hollow grooves each of which has such a width as can receive its associated one of annular-shaped projecting strip portions 4, 4 formed in the intermediate portion of the circular-shaped wall 3 of the pipe P (which will be discussed later). By fitting the annular-shaped projecting strip portions 4, 4 of the pipe into the recessed portions 24, 24, the annular-shaped projecting strip portions 4, 4 can be held so strongly that, when the pipe is connected, the movement of the pipe in the axial direction thereof can be prevented positively and thus the contacted peripheral surface thereof can be maintained watertight. Further, in the packing 20, the surface portions f, f of the peripheral-direction two end portions thereof, as shown in FIG. 6, are set so as to project outwardly of the surface portions F, F of the two end portions 12, 12 of the joint main body 10 by a thickness t preferably in the range of 0.1–1.0 mm, more preferably, in the range of 0.2–0.5 mm. Thanks to this setting, when the two joint main bodies 10, 10 are connected together and used for connection of the pipe P, the surface portions f, f of the mutually opposing packings 20, 20 can be positively contacted with each other and can be strongly pressed against each other, thereby being able to facilitate the maintenance of a watertight condition in the contacted surfaces thereof as well.

Further, in the packing 20 according to the present embodiment, as shown in FIGS. 1 and 2, on the inner surface of the projecting portion 23, there are provided two ribs r, r which project along the peripheral surface of the projecting portion 23 at a given distance from each other. Provision of these ribs r, r makes it possible to positively hold the neighboring portion of the cut end of the pipe between them, so that a watertight condition in the pipe peripheral direction can be obtained further positively. Alternatively, as the ribs r, r, there may also be formed two set of ribs, each set consisting of two ribs. Also, in the packing 20 according to the present embodiment, on one of the two end portion surface portions f, f, there is provided a semicircular-shaped rib R which terminates toward the inner surface side of the projecting portion 23 of the packing 20. This rib R is formed in such a manner that the terminal end thereof is continuous with the terminal ends of the two inner surface side ribs r, r. This can facilitate the further positive maintenance of a watertight condition in the contacted surfaces of the mutually opposing surface portions f, f of the packings 20, 20 in actual use. By the way, on the other surface portion f, there is not provided a semicircular-shaped rib R. However, as the need arises, a semicircular-shaped rib R may be provided on the other surface portion f as well.

Now, two pipes, which are to be connected together by the pipe joint according to the present embodiment and are arranged so as to have a symmetry with respect to the present pipe joint, are corrugated pipes P each having such an uneven shape, that is, such a corrugated shape as shown in FIG. 3 which is a front view thereof; and, the pipe wall 1 of the pipe P comprises a sectionally square wall portion 2 and a circular-wall section 3 arranged alternately in the axial direction of the pipe P, while the outside diameter of the circular-wall section 3 is set smaller than that of the sectionally square wall portion 2. And, in the intermediate portion of the circular-wall section 3 in the axial direction of the pipe P, there is provided an annular-shaped projecting strip portion 4 having a sectionally square and, in the intermediate portion of the projecting strip portion 4 and sectionally square wall portion 2, there are formed cutting mark lines 5, 5. In the pipe P according to the present embodiment, the cutting mark lines 5 are formed by the terminal ends of inclined walls 6, 6 which slightly increase in diameter from the projecting strip portion 4 side to the sectionally square wall portion 2 side. However, the cutting mark line 5 can be formed arbitrarily and properly by known means.

When applying the joint having the above structure to the thus structured corrugated pipe P, as shown in FIGS. 3 and 8, the two corrugated pipes P, P to be connected together are respectively cut along the mutually adjoining cutting mark lines 5 with their respective annular-shaped projecting strip portions 4 left uncut (in other words, the two corrugated pipes P, P to be connected together are respectively cut into a predetermined length at a portion of the sectionally annular portion in a plane substantially perpendicular to an axis of the pipe while remaining the annular-shaped projecting strip portions 4 uncut), the thus cut end faces are butted against each other, the annular-shaped projecting strip portions 4, 4 of the two pipes P, P that are situated at the ends of the pips P, P are respectively fitted into the recessed portions 24, 24 of the packings 20 which have been mounted into the recessed grooves 13 of the joint main bodies 10, the two joint main bodies 10, 10, as shown in FIGS. 6 and 7, are incliningly arranged such that the two end surface portions F, F of the joint main bodies 10 extend along the line of about 45 degrees, and they are respectively tightened by bolts b, - - - , a using tightening bolt holes 15, - - - which are respectively formed in the joint main bodies 10, 10.

In this manner, by connecting together the two-split joint main bodies 10, 10 in such an inclined manner that their mutually opposing surfaces to be connected extend along the angle of about 45 degrees, the end portions 12, 12 of the joint main bodies 10, 10 where the tightening or connecting bolt holes 15, 15 are formed can be connected together using the dead space of the diagonal line portions of the sectionally square portions 2 of the pipes P, P. Thanks to this, the connecting portions can be connected together in the range of the sectionally square portions 2 of the pipes P, P, that is, in a state where the connecting portions do not project from at least the virtual outer peripheral surface formed by the sectionally square portions 2.

Figure 10:
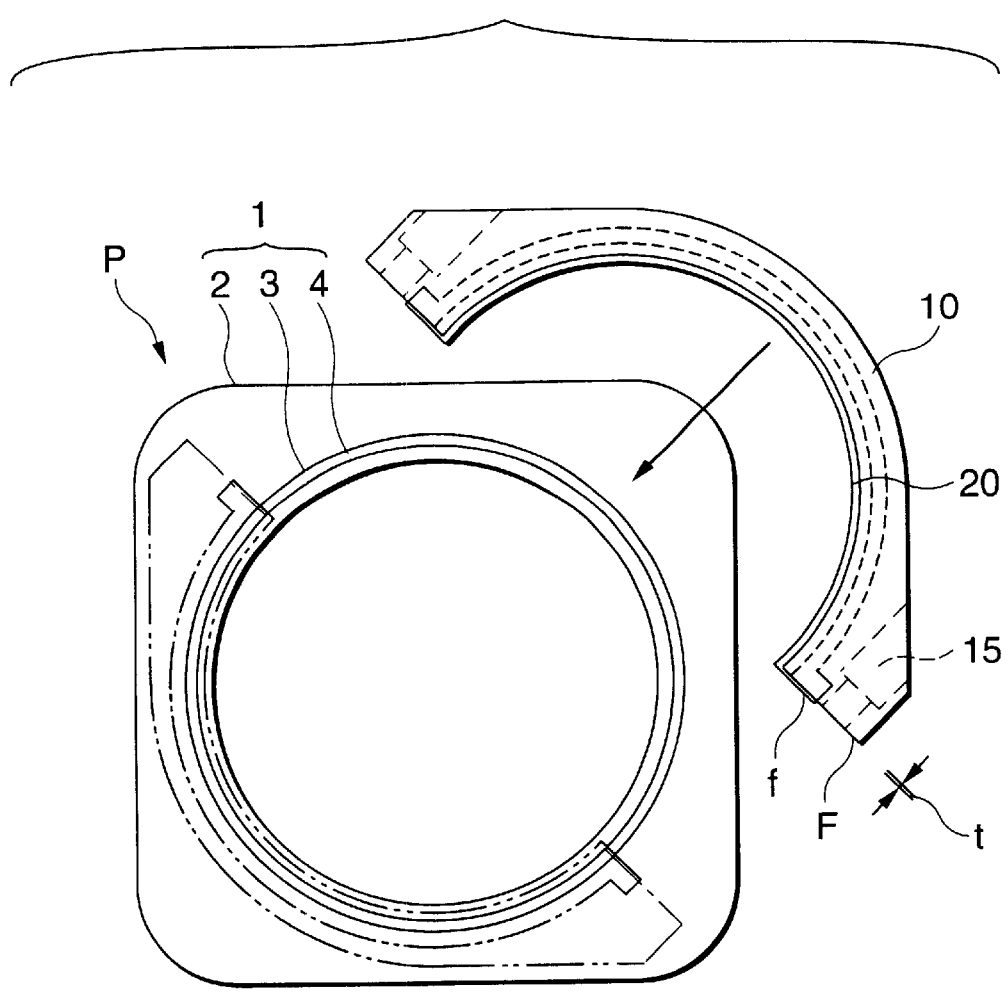
FIG. 10 is a side view of a joint according to a second embodiment of the invention and a pipe, showing the portion thereof corresponding to FIG. 7; and, FIG. 11 is a centrally transverse section of a joint according to a third embodiment of the invention.
Figure 11:
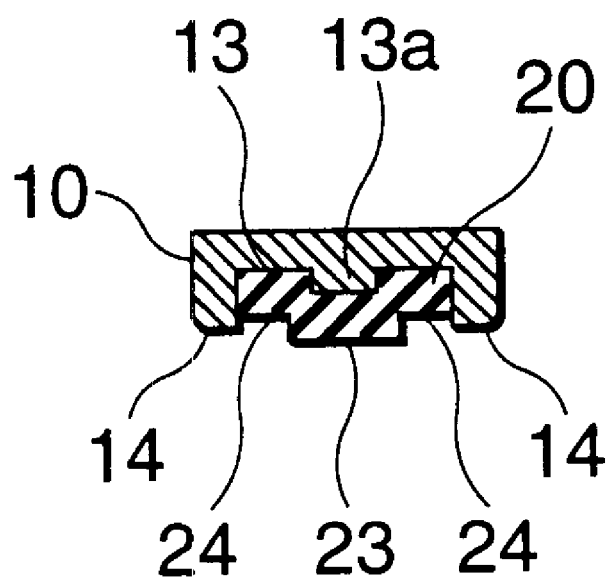

Now, FIGS. 10 and 11 respectively show other embodiments of a joint for a corrugated pipe according to the invention, Specifically, according to the embodiment shown in FIG. 10, the outer shape of the joint main body 10 is formed in an arc shape. Also, according to the embodiment shown in FIG. 11, the recessed groove 13 formed in the joint main body 10 includes a projecting beam 13a which is formed in the intermediate portion of the recessed groove 13 in the axial direction thereof so as to project on the inner surface side of the joint main body 10; and, the right and left recessed portions 24, 24 of the packing 20 respectively project on the back surface side of the packing 20 so as to have a large thickness, which, when the joint is tightened in use, can enhance the cushioning of the joint.

While description has been given hereinbefore of the typical embodiments of the invention, the invention is not always limited to these embodiments. That is, in addition to these embodiments, the invention can be changed or modified properly when it is enforced, provided that such change or modification possesses the above-mentioned composing requirements of the invention, can attain the object of the invention, and can provide the following effects of the invention.

As can be seen obviously from the foregoing description, a joint for a corrugated pipe according to the invention relates to a joint to be used for connection of only a synthetic resin corrugated pipe of a type that the shape of its pipe wall comprises a sectionally square wall portion and a sectionally circular wall portion formed alternately in the axial direction of the pipe and, in the sectionally circular wall portion, there is provided an annular-shaped projecting strip portion. More specifically, according to the invention, the joint comprises two synthetic resin joint bodies formed as two-split bodies; and, in the inner surface of each joint body, there is formed a recessed groove so as to be able to receive therein a watertight packing formed of elastic material and, in a state where the packing is mounted into the joint main body, the two side recessed portions of the packing can be inserted more deeply on the outer peripheral surface side of the joint main body than the two side edge portions of the joint main body, so that the annular-shaped projecting strip portion of the pipe can be fitted into the thus inserted recessed portions of the packing. Thanks to this, not only the movement of the pipe in the axial direction thereof can be prevented positively but also a watertight condition can be maintained in the contacted peripheral surface of the pipe due to the strong holding of the pipe by the joint. Further, the joint is structured such that the surface portions f, f of the peripheral-direction two end portions of the packing project by a proper thickness t outwardly of the surface portions F, F of the two end portions of the joint main body and, therefore, when in use, the mutually opposing surface portions f, f of the packing can be compressed strongly in a concentrated manner, which makes it possible to connect the pipe in a positive watertight condition easily and quickly.

Also, in a pipe connecting method according to the invention, after two pipes to be connected together are cut except for the annular-shaped projecting portions of the sectionally circular wall portions of the two pipes, the respective cut ends of the two pipes are butted against each other using the above-mentioned joint while the sectionally square wall portions of the pipes are held at the same posture in the peripheral direction of the pipes, in the connected portions of the two pipes through the mutually butted ends thereof, there are inserted the two watertight packings, and the two joint main bodies of the joint are tightened and connected together on the diagonal line of the sectionally square wall portions of the pipes, there by being able to connect together the end portions of the two joint main bodies using the dead space of the diagonal line portions of the sectionally square wall portions of the pipes. Thanks to this, the connecting portions of the two joint main bodies can be connected together in the range of the sectionally square wall portions of the pipes to be connected together, that is, the connecting portions of the two joint main bodies can be connected together in such a manner that they are prevented from projecting greatly at least from a virtual outer peripheral surface that is defined by the sectionally square wall portions of the pipes. Therefore, according to the present connecting method, there can be obtained an outstanding effect that such pipe arrangement as has been impossible according to the prior art can be achieved. That is, a plurality of pipes can be arranged side by side or can be piled up on top of one another without causing the pipes to meander with respect to one another, even when the pipes have the portions that are connected together by the joint.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A joint for connection of synthetic resin corrugated pipes, each of said corrugated pipes including a pipe wall which comprises a sectionally rectangular wall portions and a sectionally circular wall portions disposed alternately in a longitudinal direction of the corrugated pipe, wherein each of said sectionally circular wall portions includes an annular-shaped protrusion which projects outwardly from said sectionally circular wall portions that is disposed substantially at a center of said sectionally circular wall portion between adjacent sectionally rectangular wall portions in the longitudinal direction, said joint comprising:

a pair of semicircular-shaped joint main bodies coupled with each other by bolts, each having a recessed groove defined by both of its side edge portions in a width direction thereof and also having tightening bolt holes respectively formed at both peripheral end portions in a peripheral direction thereof; and a pair of watertight packings respectively formed of elastic material and respectively received in the recessed grooves of said semicircular-shaped joint main bodies, each of said watertight packings having a semicircular portion which includes two edge portions disposed at two end portions in a width direction thereof, and a projecting portion disposed between said two edge portions in the width direction and inwardly projected in a radial direction of said pipe, wherein a thickness of each of said two edge portions in the radial direction is smaller than a height of said side edge portion in the radial direction, whereby, in a state where each of said packings is mounted into said respective joint main bodies and said joint joins said pipes, two side recessed portions into which said annular-shaped protrusions of said pipes are respectively received are formed by said two edge portions, wherein the surface portions of the two end portions of said packing in the peripheral direction thereof project further outwardly of the surface portions of said two end portions of said joint main body by a predetermined thickness, wherein each of said watertight packing further comprises flanges disposed at two end portions of said semicircular-portion in a peripheral direction thereof and outwardly projected in the radial direction, and wherein said surface portions of the two end portions of the packing are formed at outer surfaces of said flanges.

2. A joint for a corrugated pipe as set forth in claim 1, wherein said joint main body is formed as a semicircle slightly shorter than a regular semicircle.

3. A joint for a corrugated pipe as set forth in claim 1, wherein said joint main body is formed substantially identical with or smaller in size than the outer peripheral shape of said sectionally rectangular wall portion of said pipe.

4. A joint for a corrugated pipe as set forth in claim 2, wherein said joint main body is formed substantially identical with or smaller in size than the outer peripheral shape of said sectionally rectangular wall portion of said pipe.

5. A joint for a corrugated pipe as set forth in claim 1, wherein said watertight packing includes, on the inner surface of said projecting portion, two ribs respectively extending along the peripheral direction of said packing and inwardly projecting in the radial direction of the pipe.

6. A joint for a corrugated pipe as set forth in claim 2, wherein said watertight packing includes, on the inner surface of said projecting portion, two ribs respectively extending along the peripheral direction of said packing and inwardly projecting in the radial direction of the pipe.

7. A joint for a corrugated pipe as set forth in claim 3, wherein said watertight packing includes, on the inner surface of said projecting portion, two ribs respectively extending along the peripheral direction of said packing and inwardly projecting in the radial direction of the pipe.

8. A joint for a corrugated pipe as set forth in claim 4, wherein said watertight packing includes, on the inner surface of said projecting portion, two ribs respectively extending along the peripheral direction of said packing and inwardly projecting in the radial direction of said packing and inwardly projecting in the radial direction of the pipe.

9. A joint for a corrugated pipe as set forth in claim 1, wherein said watertight packing includes, on at least one of said two end portion surface portions, a rib formed so as to terminate toward the inner surface side of said projecting portion of said packing.

10. A joint for a corrugated pipe as set forth in claim 2, wherein said watertight packing includes, on at least one of said two end portion surface portions, a rib formed so as to terminate toward the inner surface side of said projecting portion of said packing.

11. A joint for a corrugated pipe as set forth in claim 3, wherein said watertight packing includes, on at least one of said two end portions surface portions, a rib formed so as to terminate toward the inner surface side of said projecting portion of said packing.

12. A joint for a corrugated pipe as set forth in claim 4, wherein said watertight packing includes, on at least one of said two end portion surface portions, a rib formed so as to terminate toward the inner surface side of said projecting portion of said packing.

13. A joint for a corrugated pipe as set forth in claim 1, wherein said predetermined thickness of said watertight packing is set in the range of 0.1–1.0 mm.

14. A joint for a corrugated pipe as set forth in claim 1, wherein each of said recessed grooves comprises a projecting beam which is formed at its intermediate portion in the width direction thereof and is inwardly projected in the radial direction of the pipe.

15. A joint for a corrugated pipe as set forth in claim 1, wherein each of said semicircular-shaped joint main bodies comprises recessed step portions which are disposed at two peripheral ends thereof for receiving said respective flanges of said packing.

16. A joint for a corrugated pipe as set forth in claim 15, wherein the thickness of each of said flanges in the peripheral direction is larger than the depth of each of said recessed step portions in the peripheral direction, in a state where each of said packings is mounted into said respective joint main bodies.

17. A joint for connection of synthetic resin corrugated pipes, each of said corrugated pipes including a pipe wall which comprises a sectionally rectangular wall portions and a sectionally circular wall portions disposed alternately in a longitudinal direction of the corrugated pipe, wherein each of said sectionally circular wall portions includes an annular-shaped protrusion which projects outwardly from said sectionally circular wall portions that is disposed substantially at a center of said sectionally circular wall portion between adjacent sectionally rectangular wall portions in the longitudinal direction, said joint comprising:
  a pair of semicircular-shaped joint main bodies coupled together; and
  a pair of watertight packings respectively received in the recessed grooves of said semicircular-shaped joint main bodies, each of said watertight packings having a semicircular portion which includes two edge portions disposed at two end portions in a width direction thereof, and a projecting portion disposed between said two edge portions in the width direction and inwardly projected in a radial direction of said pipe.

18. The joint as set forth in claim 17, wherein a thickness of each of said two edge portions in the radial direction is smaller than a height of said side edge portion in the radial direction, whereby, in a state where each of said packings is mounted into said respective joint main bodies and said joint joins said pipes, two side recessed portions into which said annular-shaped protrusions of said pipes are respectively received are formed by said two edge portions.

19. The joint as set forth in claim 17, wherein the surface portions of the two end portions of said packing in the peripheral direction thereof project further outwardly of the surface portions of said two end portions of said joint main body by a predetermined thickness.

20. The joint as set forth in claim 17, wherein each of said watertight packings comprises flanges disposed at two end portions of said semicircular-portion in a peripheral direction thereof and outwardly projected in the radial direction.

21. The joint as set forth in claim 20, wherein surface portions of the two end portions of the packing are formed at outer surfaces of said flanges in the peripheral direction thereof and project outwardly of the surface portions of said two end portions of said joint main body by a predetermined thickness.

22. The joint as set forth in claim 17, wherein each member of said pair of semicircular-shaped joint main bodies comprises a recessed groove defined by both of its side edge portions in a width direction thereof.

23. The joint as set forth in claim 17, wherein each member of said pair of semicircular-shaped joint main bodies comprises tightening bolt holes respectively formed at both peripheral end portions in a peripheral direction thereof.

24. The joint as set forth in claim 17, wherein said pair of watertight packings comprises an elastic material.

25. A method for connecting a pair of synthetic resin corrugated pipes, each of said corrugated pipes including a pipe wall which comprises a sectionally rectangular wall portions and a sectionally circular wall portions disposed alternately in a longitudinal direction of the corrugated pipe, wherein each of said sectionally circular wall portions includes an annular-shaped protrusion which projects outwardly from said sectionally circular wall portions that is disposed substantially at a center of said sectionally circular wall portion between adjacent sectionally rectangular wall portions in the longitudinal direction, said corrugated pipe connecting method comprising:
  preparing said pair of said pipes each of which is cut into a predetermined length at a portion of said sectionally circular portion in a plane substantially perpendicular to an axis of said pipe while leaving said annular-shaped projecting strip portions uncut;
  abutting said cut portions of said pipes to each other and holding them in the same relative positions in the peripheral direction thereof;
  putting a joint on the abutting cut portions of said pipes, said joint comprises a pair of joint main bodies; and
  connecting said pair of joint main bodies together on the diagonal line of said sectionally rectangular wall portions of said two pipes, to thereby join together said two pipes.

26. The connecting method of claim 25, wherein said pair of joint main bodies comprises two semicircular-shaped split bodies each having tightening bolt holes formed in its two end portions of said main body in the peripheral direction thereof and a pair of watertight packings.

27. The connecting method of claim 26, further comprising:
  fastening bolts inserted in said tightening bolt holes.

28. A method for connecting a pair of synthetic resin corrugated pipes, each of said corrugated pipes including a pipe wall which comprises sectionally rectangular wall portions and sectionally circular wall portions disposed alternately in a longitudinal direction of the corrugated pipe, wherein each of said sectionally circular wall portions includes an annular-shaped protrusion which projects outwardly from said sectionally circular wall portions that is disposed substantially at a center of said sectionally circular wall portion between adjacent sectionally rectangular wall portions in the longitudinal direction, said corrugated pipe connecting method comprising:
  preparing said pair of said pipes each of which is cut into a predetermined length at a portion of said sectionally circular portion in a plane substantially perpendicular to an axis of said pipe while leaving said annular-shaped projecting strip portions uncut;
  abutting said cut portions of said pipes to each other and holding them in the same relative positions in the peripheral direction thereof;
  putting a joint on the connected portions of said pair of pipes, wherein said joint comprises a pair of joint main bodies respectively made of two semicircular-shaped split bodies each having tightening bolt holes formed in its two end portions of said main body in the peripheral direction thereof, and a pair of watertight packings; and fastening bolts inserted in said tightening bolt holes and then connecting said two joint main bodies together on the diagonal line of said sectionally rectangular wall portions of said two pipes, to thereby join together said two pipes.

* * * * *